Sept. 13, 1938.  J. A. RASMUSSEN  2,130,100
TRAILER HITCH
Filed Sept. 30, 1937
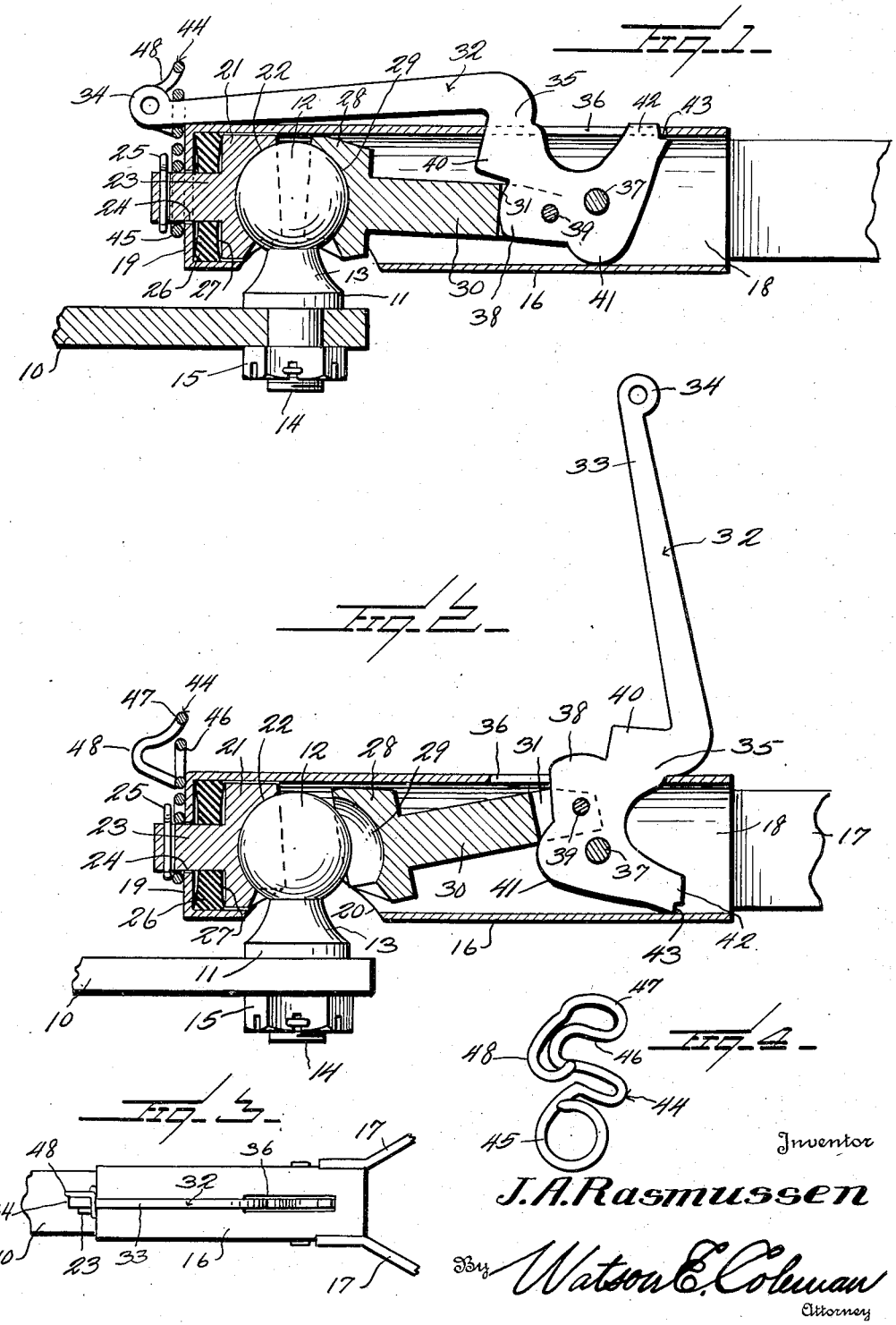

Patented Sept. 13, 1938

2,130,100

UNITED STATES PATENT OFFICE 2,130,100

TRAILER HITCH

John A. Rasmussen, Salem, Oreg., assignor of forty-nine one-hundredths to Reuben G. Doege, Salem, Oreg.

Application September 30, 1937, Serial No. 166,658

4 Claims. (Cl. 280—33.15)

This invention relates to coupling devices and, more particularly, to a trailer hitch or coupling means for use in coupling a trailer to a tractor vehicle.

An object of this invention is to provide an improved coupling means for a trailer whereby the trailer may be quickly attached or detached from the tractor vehicle.

Another object of this invention is to provide in a trailer hitch, means for cushioning the coupling means with respect to the tractor vehicle so as to take up the shocks incident to the movement of the tractor and the trailer.

A further object of this invention is to provide in a device of this kind, an improved locking means for detachably locking the trailer coupling onto the tractor vehicle, the locking means being so constructed that the coupling device will not accidentally become disengaged with the connector carried by the tractor vehicle.

A still further object of this invention is to provide in a trailer hitch of this character, means whereby the releasing means for the coupling may be locked by a suitable locking device so that unauthorized persons cannot detach the trailer from the tractor vehicle.

With the foregoing and other objects in view, the invention will be more fully described hereinafter, and will be more particularly pointed out in the claims appended thereto.

In the drawing, wherein like symbols refer to like or corresponding parts throughout the several views:

Figure 1 is a longitudinal section partly in detail of a trailer hitch constructed according to an embodiment of this invention, showing the hitch in locked position.

Figure 2 is a similar view but showing the hitch in released position.

Figure 3 is a detailed top plan of the hitch.

Figure 4 is a detailed front elevation of the keeper used for holding the hitch in locked position.

Referring to the drawing, the numeral 10 designates generally, a draw bar which is adapted to be secured to, or form a part of a tractor vehicle. This draw bar 10 may comprise a part of the framework or other structure forming the tractor vehicle and with which the hereinafter described trailer hitch may be engaged.

A coupling pivot member, generally designated as 11, is adapted to be fixedly secured to the draw bar 10, and comprises a spherical head 12 provided with a flanged stem portion 13, and a threaded stud 14 which extends through a suitable opening provided in the draw bar 10. The stud 14 is fixedly secured in the draw bar 10 by means of a nut 15.

A housing 16 is secured to a pair of supporting bars 17 which are adapted to be secured to the draw bar or the forward portion of a trailer member (not shown) and the housing 16 in the present instance, is disclosed as being of hollow construction with an open rear end 18 and a wall 19 at its forward end. The housing 16 is provided in its lower side with an opening 20 through which the head 12 is adapted to engage. A socket member 21 is slidably mounted in the forward portion of the housing 16, and is provided with a concave face portion 22 adapted to engage about the head 12.

The socket member 21 has a stud or shaft 23 preferably integral therewith, extending forwardly and outwardly through an opening 24 in the end wall 19. A cotter pin or like member 25 is mounted transversely through the shaft 23 and is adapted to limit the inward movement of the socket member 21.

A cushioning member 26 is interposed between the forward end of the socket member 21 and the forward wall 19 and, in the present instance, this cushioning member 26 is constructed in the form of an annulus, constructed of rubber or like yieldable material which is provided with concave face portion 27 on the forward and rear sides thereof.

A second socket member 28 is slidably mounted in the housing 16, and is provided with a concave forward face portion 29 adapted to engage the surface of the head member 12. A shank or shaft member 30 is formed integral with the socket member 30, and is provided at its rear end with a slot 31 in which a portion of a combined locking or releasing lever, generally designated as 32, is adapted to engage. The lever 32 comprises an elongated handle 33, provided with an eye 34 on its outer end, and this lever 33 has a crank portion 35 extending through a slot 36 provided in the upper side of the housing 16. The crank portion 35 is pivoted on a pin, or shaft 37, extending transversely across the housing 16.

The crank portion 35 is provided with a lug 38 through which a pin 39 engages, the pin 39 being secured in the rear end of the shank 30 so as to pivotally secure the crank portion 35 onto the shank 30. An offset portion 40 is provided on the crank portion 35 which is adapted to overlie the shank 30 when the lever 32 is in locking position as shown in Figure 1. The crank member 35 is also provided with an offset portion 41 which is adapted to engage the inner surface of the housing 16, in the bottom thereof when the crank member, or lever 32, is in locking position as shown in Figure 1.

An arm 42 is carried by the crank 35 and extends obliquely therefrom, and is provided at its terminal end with a notch 43, adapted to engage the rear end of the slot 36 in the event undue play occurs between the crank 35 and the pin 37.

In order to releasably hold the lever 32 in a locking position, I have provided a keeper, generally designated as 44, which is adapted to be mounted on the stud, or shank 23, at the forward end of the housing 16. This keeper 44 comprises a loop 45, formed preferably of spring steel, which is provided with a U-shaped keeper portion 46. The keeper portion 46 has an extension 47 which is reverted and terminates in a loop 48, the axis of which is substantially co-planar with the axis of the eye 34 when the lever 32 is in locking position so that a conventional lock may be engaged through the eye 34 and the eye 48, and thus hold the lever 32 against unauthorized release.

In the use and operation of this trailer hitch, the housing 16 is adapted to be fixedly secured as by the supporting members 17, to the forward end of the trailer and the pivotal member, or head 12 is adapted to be secured to the draw bar 10 of the tractor vehicle. In the released position of the lever 32, this lever 32 is raised, thus pulling the socket member 28 rearwardly a distance sufficient to permit the head 12 to engage between the two socket members 21 and 28.

In the released position the pin 39 is disposed above the horizontal axis of the pin 37. After the head 12 is disposed between the two socket members 21 and 28, the lever 32 can be rocked forwardly and downwardly so that the socket member 28 will be moved forwardly against the head 12 in a manner to compress the cushioning member 26. The forward end of the lever 32 is adapted to snap over the looped portion 47 of the keeper 44 and engage within the U-shaped keeper portion 46.

In this locked position, the pin 39 will have the horizontal axis thereof disposed below the horizontal axis of the pin or shaft 37, and the cutout portion 43 of the arm 42 will be disposed adjacent the rear end of the slot 36. Any strain applied to the releasing socket 28 will, by reason of the position of the pin 39 when in locked position, tend to tighten the lug, or offset portion 41, against the lower side of the housing 16. When the lever 32 is in locked position, the lug 38 will be contacting with the forward or closed end of the slot 31 in the shank 30 so that there will be no undue play or movement between the shank 30 and the crank 35.

In the event there is undue play between the crank 35 and the pin 37, the notched portion 43 of the arm 42 will contact with the rear end of the slot 36 so as to relieve the pin 37 of any undue strain after it becomes worn to such an extent that the arm 42 will contact with the rear end of the slot 36.

It will be apparent from the foregoing that an exceedingly simple trailer hitch has been disclosed whereby a trailer may be quickly coupled or uncoupled from a tractor vehicle and that any shocks incident to the movement of the tractor and trailer vehicles, will be absorbed within the coupling. This hitch, as hereinbefore described, is so constructed that the trailer cannot readily become accidentally uncoupled from the tractor vehicle so there is no possibility of the two vehicles becoming uncoupled during the movement thereof.

It is, of course, understood that various changes and modifications may be made in the details of construction and design of the above specifically described embodiment of this invention without departing from the spirit thereof, such changes and modifications being restricted only by the scope of the following claims.

I claim:
1. A trailer hitch comprising a pivot member adapted to be secured to a tractor vehicle, a housing having an opening to receive said pivot member, opposed socket members slidable in said housing, a shank carried by one of said socket members extending through an end of said housing, means about said shank cushioning the movement of said one socket member in one direction, a slotted shank carried by the other socket member, a bell crank lever rockably carried by said housing, means pivotally securing said lever to the slotted end of said second shank and means carried by said lever engageable with said housing to hold said other socket member against undue movement upon damage or wearing of the pivotal connection between said lever and said housing.

2. A trailer hitch comprising a pivot member adapted to be secured to a tractor vehicle, a housing having an opening to receive said pivot member, opposed socket members slidable in said housing, a shank carried by one of said socket members extending through an end of said housing, means engaging said shank limiting the inward movement thereof, a slotted shank carried by the other socket member, a bell crank lever rockably carried by said housing, means pivotally securing said lever to the slotted end of said second shank, and a keeper carried by said first shank engageable with said lever to hold said lever in locked position.

3. A trailer hitch comprising a pivot member adapted to be secured to a tractor vehicle, a housing having an opening to receive said pivot member, means securing said housing to a trailer, opposed socket members slidable in said housing, a shank carried by one of said socket members extending through an end of said housing, means engaging said shank limiting the inward movement thereof, a slotted shank carried by the other socket member, a bell crank lever rockably carried by said housing, means pivotally securing said lever to the slotted end of said shank, and a lug carried by said lever engageable against the inner end of said slot in said second shank to thereby relieve said pivot means from strain.

4. A trailer hitch comprising a pivot member adapted to be secured to a tractor vehicle, a housing having an opening to receive said pivot member, means securing said housing to a trailer, opposed socket members slidable in said housing, a shank carried by one of said socket members extending through an end of said housing, means engaging said shank limiting the inward movement thereof, a slotted shank carried by the other socket member, a bell crank lever rockably carried by said housing, means pivotally securing said lever to the slotted end of said second shank, said housing having an elongated slot through which a portion of said lever projects, and an arm carried by said lever interiorly of said housink, said arm being disposed with a portion thereof within said slot when said lever is in locked position, said arm portion being engageable against the end of said slot in said housing upon movement of said other socket member longitudinally of said housing to thereby hold said other socket member against undue movement upon damage of the pivotal mounting for said crank lever.

JOHN A. RASMUSSEN.